United States Patent
Cattaneo et al.

(10) Patent No.: US 11,320,541 B1
(45) Date of Patent: May 3, 2022

(54) GEOREFERENCING CERTIFICATION METHOD AND SYSTEM FOR MOBILE DEVICES

(71) Applicant: ETUITUS SRL, Fisciano SA (IT)

(72) Inventors: Giuseppe Cattaneo, Fisciano (IT); Pompeo Faruolo, Fisciano (IT); Marco Mannetta, Fisciano (IT)

(73) Assignee: ETUITUS SRL, Fisciano SA (IT)

( * ) Notice: Subject to any disclaimer, the term of this patent is extended or adjusted under 35 U.S.C. 154(b) by 445 days.

(21) Appl. No.: 16/606,465

(22) PCT Filed: Apr. 19, 2018

(86) PCT No.: PCT/IT2018/050068
§ 371 (c)(1),
(2) Date: Oct. 18, 2019

(87) PCT Pub. No.: WO2018/193487
PCT Pub. Date: Oct. 25, 2018

(30) Foreign Application Priority Data

Apr. 20, 2017 (IT) .......................... 102017000043174

(51) Int. Cl.
*G01S 19/21* (2010.01)
*G01S 19/03* (2010.01)
(Continued)

(52) U.S. Cl.
CPC ............ *G01S 19/215* (2013.01); *G01S 19/03* (2013.01); *G01S 19/256* (2013.01); *G01S 19/29* (2013.01); *G01S 19/30* (2013.01); *H04W 12/63* (2021.01)

(58) Field of Classification Search
CPC ....... G01S 19/03; G01S 19/215; H04W 12/63
See application file for complete search history.

(56) References Cited

U.S. PATENT DOCUMENTS 5,757,916 A * 5/1998 MacDoran ............ G01S 19/215
380/258
7,609,201 B2 * 10/2009 Masuda .................. G01S 19/23
455/410

(Continued)

FOREIGN PATENT DOCUMENTS

WO      WO 2015/001483       1/2015

OTHER PUBLICATIONS

Schielin et al.; On the Foundation of GNSS Authentication Mechanisms; GNSS 2012—Proceedings of the 25th International Technical Meeting of the Satellite Division of the Institute of Navigation (ION GNSS 2012), Sep. 21, 2012; pp. 1194-1207.

(Continued)

*Primary Examiner* — Gregory C. Issing
(74) *Attorney, Agent, or Firm* — Knobbe Martens Olson & Bear LLP

(57) ABSTRACT

The present invention relates to a georeferencing certification method actuated by means of a central unit with one or more GNSS sensors and one or more mobile devices which request the georeferencing. The mobile device will collect the information monitored by the GNSS sensor installed on the mobile device and send it to the central unit, which will compare the information received with that which it has acquired through its relative GNSS sensors. The result of the comparison will authorise, or not, the unit to issue the georeferencing certification.

7 Claims, 2 Drawing Sheets

(51) Int. Cl.
*G01S 19/30* (2010.01)
*G01S 19/25* (2010.01)
*G01S 19/29* (2010.01)
*H04W 12/63* (2021.01)

(56) References Cited

U.S. PATENT DOCUMENTS

| | | |
|---|---|---|
| 2010/0134352 A1 | 6/2010 | Thomson et al. |
| 2014/0104102 A1 | 4/2014 | Enge et al. |
| 2014/0368380 A1* | 12/2014 | Revol .................. H04K 3/90 342/357.29 |

OTHER PUBLICATIONS

International Search Report and Written Opinion of the International Searching Authority for International Application No. PCT/IT2018/050068, dated Jun. 14, 2018, in 12 pages.
Search Report issued in Italian Application No. IT 201700043174, dated Dec. 6, 2017, in 10 pages.

* cited by examiner

GEOREFERENCING CERTIFICATION METHOD AND SYSTEM FOR MOBILE DEVICES

This invention relates to a georeferencing certification method and system for mobile devices.

More specifically, the invention relates to a georeferencing certification method actuated by means of a central unit with one or more GNSS sensors or receivers (Global Navigation Satellite System) and one or more mobile device which require the georeferencing. The mobile device will collect the information monitored by the GNSS sensor installed on the mobile device and send it to the central unit, which will compare the information received with that which it has acquired through its relative GNSS sensors. The result of the comparison will authorise, or not, the central unit to issue the georeferencing certification.

Introductory Principles

All satellite navigation systems are based on the same approach: a network of satellites orbiting around Earth which send radio signals for calculating position, speed and time (PVT). The receiving devices, knowing the positions of each satellite (ephemerides), calculate the distance from the satellites captured and are able to calculate the relative position on Earth by using a positioning technique known as "trilateration".

More specifically, the NAVSTAR GPS system simultaneously transmits different ranging codes and navigation messages on certain radio frequencies. Each satellite sends two types of ranging codes, one called C/A Code (Coarse Acquisition Code) and the other called P(Y) Code (Precision Y-code). Both these codes are specific pseudorandom binary sequences (PRN) for each satellite. In fact, each satellite of the constellation has a Space Vehicle Identifier (SV ID) and a Pseudorandom Noise Number (PRN Number) which uniquely identifies the codes generated by the individual satellite.

The C/A code is for civil use and is transmitted in clear text on the L1 radio frequency at repeated intervals. Even though it is a PRN code, the C/A-code is predictable and can be reproduced in the mobile device to be synchronized with that generated by the satellite. The P(Y)-code is encrypted by modulating with an encrypted sequence called W-code, updated regularly by the United States Department of Defence, from which an encrypted Y-code is obtained. The P(Y)-code is transmitted on the L1 and L2 radio frequencies and can be used for navigation exclusively for military purposes. These codes cannot be used for navigation and positioning in the common mobile devices for civil use. This cannot be decrypted and predicted and appears as a background noise, but given its structure and the known frequencies with which the code is applied, using suitable techniques, it is possible to detect it, trace it and use it jointly with the C/A-code to improve the positioning position of the latter.

A 50 bit/s navigation message called LNAV (Legacy Navigation) is added in the GPS Legacy above the ranging signals C/A and P(Y) L1. The navigation message comprises 3 types of information: date, time and health of the specific satellite; position in orbit of the single satellite of the constellation (ephemerides—valid for 4 hours); status of the entire constellation, approximate position of all the satellites and ionospheric models for correction of the propagation errors of the radio signal (almanac—valid for 180 days).

In order to establish precisely the position a on Earth it is necessary to calculate the distance of at least 4 satellites from said GNSS receiver. The greater the number of satellites visible at a certain instant, the greater will be the precision of the calculation of the position of the device. Each LNAV message sent contains the timestamp of when it was generated. The timestamp is produced through the atomic clock on-board the satellite. The time of the satellite is regularly synchronized from Earth in order to correct the errors induced by orbital speed and terrestrial gravity. The signal propagation time is calculated by comparing the timestamp generated on the satellite with the arrival timestamp generated on the mobile device, knowing the propagation speed and the relative global ionospheric correction models contained in the LNAV message.

BACKGROUND ART

As explained above, the majority of the modern mobile devices have a multi-constellation and multi-band GNSS sensor for precisely locating the relative position. The main global satellite constellations are NAVSTAR GPS of the United States and GLONASS of Russia, but sensors are becoming widespread on the market which are able to acquire and process signals also from other global satellite systems, such as the future BEIDOU-2 of China and the future GALILEO of the European Union.

Currently, the detection of the information is not very reliable from the point of view of security, as it can be easily manipulated on the common mobile devices. Equipment exists which is able to reproduce or retransmit GNSS signals, referable to a certain position, tricking the detection carried out by the sensor of the mobile device (spoofing).

Various methods have been proposed in the scientific literature in order to verify whether a GNSS signal detected by a sensor is original or has been altered. These methods mostly offer mechanisms for identifying possible inconsistencies in the signal detected, which are only present in a signal reproduced artificially, but they cannot always be actuated on devices or are too complex to be implemented on common mobile devices, which are characterised by limited processing power and low availability in terms of memory and autonomy.

Aim of the Invention

The aim of the invention is to provide a system and a method which resolve the problem and overcome the limitations of the prior art, providing a certification of the georeferencing carried out by a mobile device equipped with a GNSS (Global Navigation Satellite System) sensor or receiver.

The object of this invention is a method and a system according to the accompanying claims.

DETAILED DESCRIPTION OF EMBODIMENTS OF THE INVENTION

List of Drawings

The invention is now described, by way of example and without limiting the scope of the invention, with reference to the accompanying drawings, in which.

Figure 3:
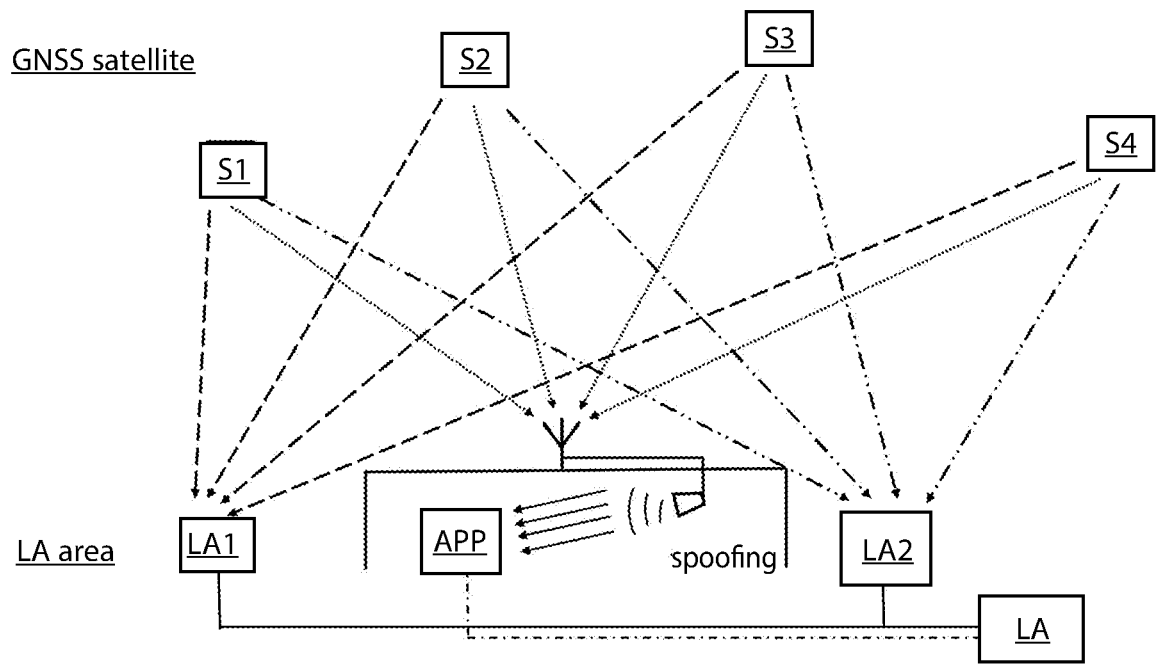
Figure 4:
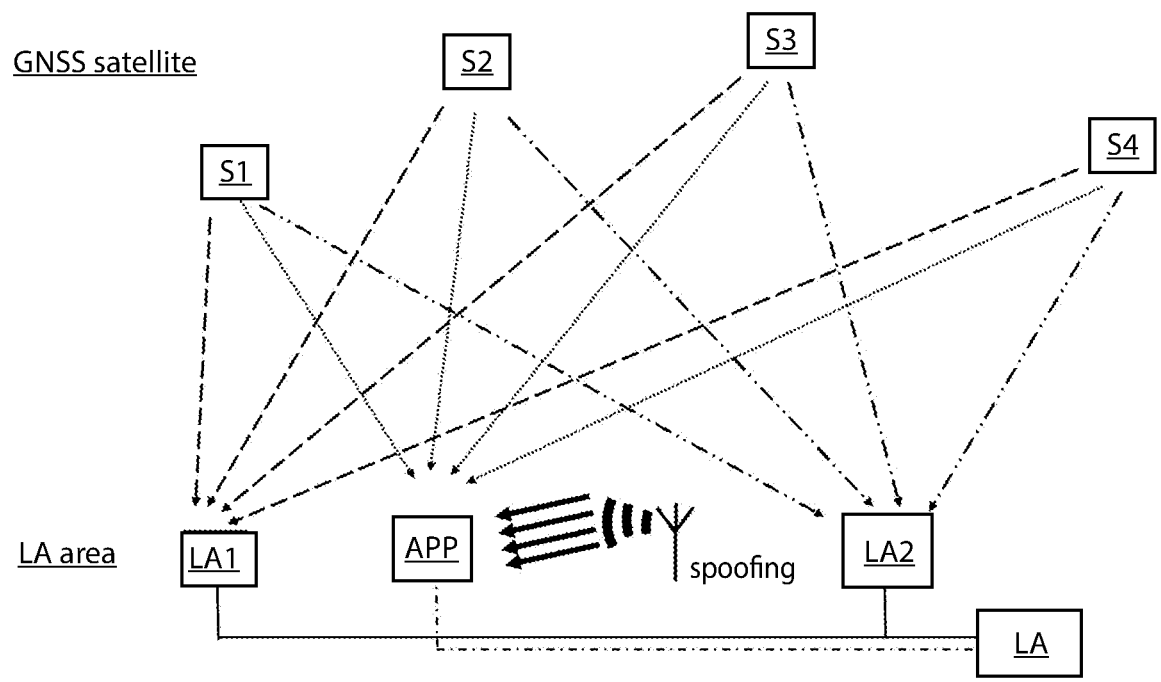

FIG. 3 shows a SCENARIO 2: spoofing of the GNSS signal with acquisition of the original signals using an antenna and retransmission of signals processed in an environment isolated from signals sent from the satellites; and FIG. 4 shows a SCENARIO 3: spoofing of the GNSS signal with a single antenna simulator outdoors configured for generating a signal having a power greater than the power of the GNSS signal.

It should be noted that elements of different embodiments can be combined together to provide further embodiments without limitations in accordance with the technical concept of the invention, as the average technician of the sector intends, without problems.

This description also refers to the prior art for its implementation, concerning the detailed features not described, such as, for example, elements of lesser importance generally used in the prior art in solutions of the same type.

When an element is introduced it is always meant that there can be "at least one" or "one or more".

When a list of elements or featured is provided in this description it means that the invention "comprises" or alternatively "consists of" these elements.

INTRODUCTION

The aim of the invention is to certify the georeferencing carried out by a mobile device equipped with a GNSS (Global Navigation Satellite System) sensor or receiver.

Generally speaking, a GNSS sensor or receiver is an electronic device which is able to acquire radio signals from different global satellite navigation constellations.

The invention defines a system wherein a user can certify the relative position from a remote server, i.e. a certification server, sending the necessary data to said server for verifying said position.

The certification server can analyse both the high level data, that is, the structure of the packets and the navigation messages of the specific GNSS satellite constellation modulated on the radio signal, and the low level raw data relative to the characteristics of the radio signals received.

In order to render the verification robust, certification server requests the sending of various types of information, such as, for example, the data present in the high level satellite navigation messages and the low level unprocessed raw data relative to the radio signals acquired on the client's side by the various global satellite location systems.

The certification server will compare the data with that in its possession, (detected using the GNSS sensors or receivers, processed and logged on the server side at regular intervals of time within a specific time window) and may identify any discrepancies and anomalies resulting from fraudulent attempts.

In the case of coherent data it will produce a certificate for certifying the position of the user.

Description of Method

The method is based on the client-server interaction model: the certification server is the Authority entrusted with Georeferencing LA and a client is in execution on the mobile device APP (APP indicates both the client application and the mobile device). Client and certification server are connected through a data communication network (shown in the drawings with a dot-dashed line) according to the available prior art.

The certification server LA will provide the secure georeferencing service (certification of the position) to the users when requested using the client application APP. A user who requests the secure location must execute the client application APP on the relative mobile device; the client application APP will collect the information monitored by the GNSS sensor installed on the mobile device and will send it to the certification server LA.

The certification server LA operates in a specific area di competence and, through various GNSS sensors (called here LA1, LA2 ... LAi ... LAx), located on said area of competence and connected together with networks of cables and/or by wireless means, will continuously acquire the GNSS signals.

The structure of the packets, the high level navigation messages (data bits), the data processed by the GNSS sensor and the low level characteristics of the radio signals will be stored and used at every secure georeferencing request received from a mobile device for verifying the authenticity and certifying the position.

Prerequisites

The client application APP must be able to access, in addition to the high level navigation messages (data bits) added to the PRN codes, the low level raw data relative to the radio signals detected by the GNSS receiver through necessary services provided on the hardware and/or software sides. The low level data are the civil pseudorange code C/A L1, the encrypted military signal P(Y)-code, the Doppler effect, carrier wave, phase, the signal/noise ratio and other characteristics.

The user who users the client application APP must be registered with the secure georeferencing service, identifying both the client application APP request and the mobile device on which it is executed (the so-called enrolment phase).

Detailed Method

The user starts the client application APP to request a secure georeferencing. The client application APP requests the certification server to start a georeferencing session. The client-server communication will be performed in a secure manner using encrypted communication protocols.

The first duty will be to synchronize the clock of the mobile device with that of the certification server LA, executing a time synchronization protocol.

Subsequently, the client application APP sends the following encrypted information, for a certain period of time and for each GPS L1 satellite radio signal received at that precise instant:

1. the low level raw data: values of the civil pseudorange code C/A-code and relative phase; values relative to the signal carrier wave, the phase, the Doppler displacement, the power and the signal/noise ratio (C/N$_0$—carrier to noise density and/or SNR—signal to noise ratio); values which describe the pattern of the encrypted military signal P(Y)-code;
2. the high level satellite navigation messages (data bits acquired and processed on client side) of all the satellite systems which are visible and can be detected by the specific GNSS sensor installed on the mobile device at that precise instant (GPS, GLONASS, BEIDOU, GALILEO), both at protocol level (data frame) and the data processed by the client APP in a specific data format.

The time window in which the data will be acquired is a parameter selected by whoever is providing the service. The time window will have a minimum amplitude of between 4 e 10 seconds.

The server, after having received this data, will start the verification step which firstly performs an analysis for each single type of information and then crosschecks all the low level raw data and high level data in order to determine any inconsistencies. A detailed description is given below of the checks which the certification server may actuate.

Verification of the Signals and the GNSS Data

Figure 1:
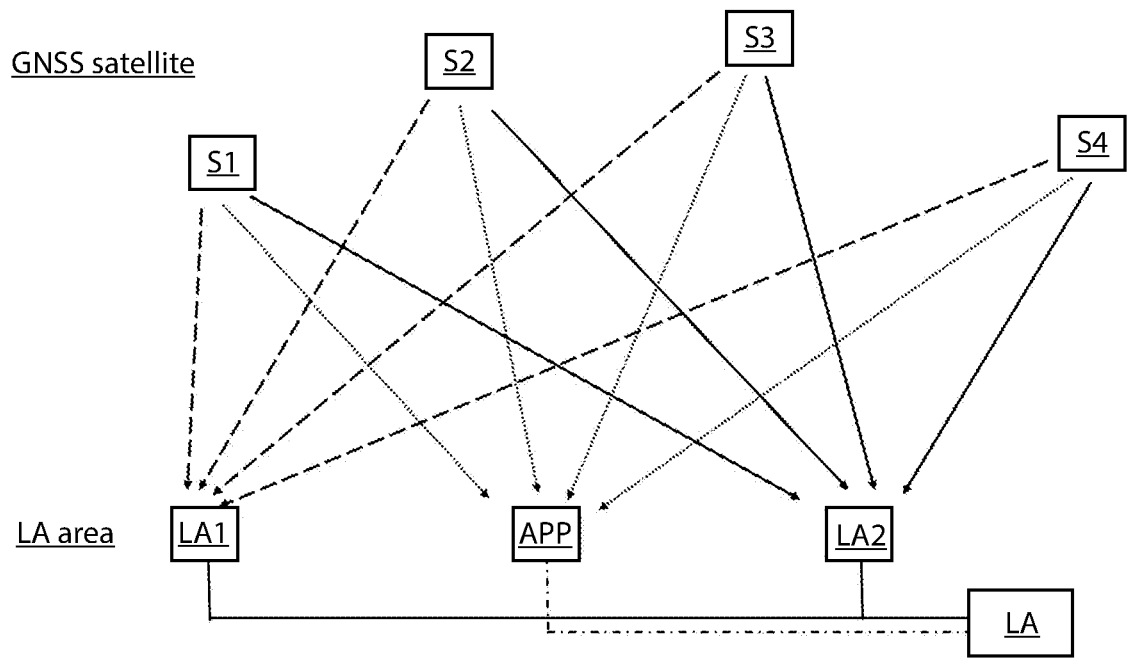
FIG. 1 shows GNSS signals, the certification server and the mobile device with the client application.

With reference to FIG. 1, each certification server LA has available at least two multi-constellation and multi-band/multi-channel GNSS receivers.

A comparison will be made on the certification server LA side of the raw data of the radio signals, the high level data (structure of the packets and navigation messages) and the data processed by the GNSS sensors in the reference time window. All the differences and the inconsistencies between GNSS information acquired on the certification server (LA) side and sent to the client (APP) side will be labelled as possible fraudulent attempts.

In order to verify and certify the consistency and the truth of the information received, depending on the type of data available and sent to the client side, the certification server LA applies the following anti-spoofing techniques organised in 4 steps:

STEP A: control of the direction of the signals, speed and movement of the GPS satellites received.

On the certification server LA side, the following will be acquired for each signal received from GPS satellite (FIG. 1—satellites S1, S2, S3 and S4): the values and the phase of the PRN C/A-code L1 code, the values of the carrier wave and of the phase of the low level radio signal and the values of the Doppler effect generated by the relative displacement of the GNSS satellite-receiver—continuous change of the frequency of the signal emitted—(Table 1—values A1, A2, A3, A4 and A5). By using various GNSS sensors on the server side, installed in the area of competence where the certification server LA operates, using, for example, the radio signals interferometry technique (bibliographical reference "Detection and Mitigation of GPS Spoofing Based on Antenna Array Processing"—J. Magiera, R. Katulski), calculations are made, in a specific reference time window, of the direction of the radio signals and the speed of the satellites with respect to the GNSS sensors of the certification server LA. The same values (A1, A2, A3, A4, A5) are also acquired on the client side and sent to the certification server LA for calculation of the direction of the signals and the speed of the satellites with respect to the mobile device.

The direction of the signal and the speed of the satellites calculated in the reference time window between certification server LA and client APP must be equal; discrepancies indicate that the signal is not genuine.

STEP B: comparison of the power, signal/noise ratio of the radio signal and the noise of the pseudorange code C/A-code l1 code of the GPS.

The certification server LA verifies that the values sent from the mobile device relative to the power of the signals (B1), signal/noise ratio (B2)—(C/N$_0$—carrier to noise density and/or SNR—signal to noise ratio)—and noise of the pseudorange code C/A-code L1 (B3) of all the GPS satellites GPS captured in the reference time window belong to a predetermined range of values which can actually be registered by the mobile device.

STEP C: comparison of the military pseudorange GPS code, encrypted P(Y)-Code L1.

The pattern will be traced on the server side of the military pseudorange code P(Y)-code (C3), which is encrypted and not predictable, for each GPS satellite received inside the reference time window. The values of these patterns acquired on the server side will be compared with the values of the patterns acquired and sent on the client side. These values must be identical.

STEP D: Comparison of the data packet and of the data bits contained therein (telemetry, navigation message). Comparison of the high level data processed by the GNSS sensor for all the satellites captured of the various global constellations currently active.

The certification server LA will compare the data acquired with that of the client relative to the structure of the packets (D1) with relative navigation messages (data bits)—(D2)—and data processed by the GNSS sensor (D3) from all the satellites captured in the reference time window. The client's data must be identical to the same values acquired from the certification server LA. The high level data includes the verification of the transmission intervals of the GNSS satellite signals; the verification of the consistency of the sending and arrival timestamps; the verification of the correctness of the specific data of the various satellites captured in the specific instant and place: the structure of the packets (D1—frames, sub-frames and words), the navigation message contained in the packet (data frame—D2) and the high level data processed by the GNSS sensor (D3) must all be identical.

TABLE 1

Summary of possible data to be verified on server side

| | Low level data |
|---|---|
| STEP A | A1. Values of predictable GPS pseudorange code C/A-code L1;<br>A2. Phase values of GPS pseudorange code C/A-code L1;<br>A3. Carrier wave values of GPS radio signal;<br>A4. Phase values of GPS radio signal;<br>A5. Doppler effect values of GPS radio signal; |
| STEP B | B1. Power values of GPS radio signal;<br>B2. Signal/noise ratio values (C/N$_0$ - carrier to noise density and/or SNR - signal to noise ratio) of GPS;<br>B3. Values of statistics relative to noise of pseudorange code C/A-code L1 of GPS:<br>    Standard deviation of larger semi-axis of error ellipse (in metres);<br>    Standard deviation of smaller semi-axis of error ellipse (in metres);<br>    Orientation of larger semi-axis of error ellipse (in degrees);<br>    Standard deviation in metres of latitude error (in metres);<br>    Standard deviation in metres of longitude error (in metres);<br>    Standard deviation in metres of altitude error (in metres); |
| STEP C | C1. Values relative to pseudorandom pattern of encrypted unpredictable military P(Y)-code; |
| | High level data |
| STEP D | D1. Structure of data packet relative to specific satellite constellation.<br>In the case of GPS structure and data bits of frame, sub-frames and words of telemetry:<br>    Preamble;<br>    Parity bits;<br>    Synchronization bits.<br>D2. Navigation message contained in the data packet of the specific satellite constellation (data frame).<br>In the case of GPS the following words:<br>    Correction on the standard frequencies, age of data (AODC) and coefficients for the ionospheric delay relative to the frequency L1, sent by the control centre;<br>    Ephemerides of each satellite and reference instant AODE (Age of Data) sent by the control centre;<br>    Almanac of the entire satellite constellation generated by the control centre (truncated ephemerides, corrections of clocks, satellite identification number, health of satellite);<br>D3. High level data extracted from the navigation message and processed by the GNSS receiver.<br>In the case of GPS:<br>    Total number of satellites in view;<br>    Total number of satellites in use;<br>    PRN Satellite number;<br>    Elevation of satellite in degrees (max 90);<br>    Azimuth of satellite in degrees (from 000 to 359); |

TABLE 1-continued

Summary of possible data to be verified on server side

Eccentricity;
Speed of satellite with respect to ground;
HDOP (Horizontal Dilution Of Precision);
VDOP (Vertical Dilution Of Precision);
PDOP (Position (3D) Dilution Of Precision;
TDOP (Time Dilution Of Precision);
Date and time;
Week number of GPS system;
Latitude of calculated position;
Longitude of calculated position;
Height of GNSS receiver above sea level;
Separation from geode;
Quality of GPS signal;
Magnetic variation;

Results of Verifications

Only if all the previous verifications (for all the data or a sub-set of those in the table) have given a positive result will the certification server LA certify the user's position, providing the client application APP with a georeferencing certificate digitally signed with a legal value and marked digitally, certifying the position of the user at that particular moment.

In other words, the method for the georeferencing certification of a mobile device APP (equipped with mobile device clock and a mobile GNSS sensor) by a certification server LA (equipped with server GNSS sensor and server clock), where the mobile device and certification server are connected through a data communication network, comprises the following steps:

A. running on the mobile device APP an application configured to manage the certification APP on the mobile device side;

B. requesting, through said application, a georeferencing certification to said certification server LA;

C. performing a synchronization between the mobile device clock and the server clock, by performing a time synchronization protocol simultaneously on the mobile device APP and the certification server LA;

D. acquiring, via said mobile GNSS sensor and for each radio-visible satellite S1-S4, a GNSS satellite radio signal at any instant of time t of a predefined time window;

E. obtaining from said mobile GNSS sensor of step D and sending to said certification server LA a set of information derived from said GNSS satellite radio signal and relating to:
a first data group relating to power, signal/noise ratio, noise pseudorange code C/A-code L1,
a second data group relating to military pseudorange code, encrypted P(Y)-code L1, structure data of the data packet and of the data bits contained therein including telemetry and navigation message, and
a third data group relating to Doppler effect, carrier wave, phase;

F. acquiring, by means of said GNSS server sensor LA1, LA2 and for each radio-visible satellite S1-S4, a GNSS satellite radio signal at any instant of time t of a predefined time window;

G. obtaining, from said sensor of step F on the basis of said GNSS satellite radio signal of step F, a first, a second and a third set of data corresponding to said first, second and third set of data of step E;

H. calculating, by said certification server LA:
signal direction, speed and displacement of each radio-visible satellite S1-S4 which is radio-visible to the mobile device APP on the basis of said third set of data;
signal direction, speed and displacement of each radio-visible satellite S1-S4 which is radio-visible to the certification server LA on the basis of said third set of corresponding data;

I. comparing, by the certification server LA:
said first set of data and said first set of corresponding data, one by one, verifying that the differences fall into predefined intervals;
said second set of data and said second set of corresponding data, one by one, verifying that they are identical;
signal direction, speed and displacement of the radio-visible satellite that is radio-visible to the mobile device and signal direction, speed and displacement of the radio-visible satellite that is radio-visible to the server, one by one, verifying that the differences fall into further predefined intervals;

L. only in the case where all the verifications in step I are positive, sending, by the certification server LA to the mobile device APP, a georeferencing certificate that includes the date, said predetermined time window and the position of the mobile device APP in said time window.

Innovations with Respect to the Prior Art

The invention has certain substantial peculiarities with respect to the prior art which can be summarised as follows:
use of a certification server (which is a trusted Georeferencing Authority) which acquires GNSS signals independently from the mobile devices;
transmission of the GNSS signals acquired from the mobile devices to the certification server;
comparison, by the central certification unit, according to predetermined criteria, of the two sets of signals independently acquired; and
issue of the certificate only when the above-mentioned criteria are satisfied.

Resistance of the Method to Spoofing Attacks

The radio signals of the visible GNSS satellites arrive from space with various angles and each individual satellite moves with an approximate sped of 14,000 km per hour.

Any GNSS simulator in a protected environment will try to reproduce the signals of all the satellites visible in a given place and time, trying to recreate, with regard to the GPS constellation, the specific predictable code C/A-code L1.

In order to reproduce all the GNSS satellites in view, a hypothetical attacker should prepare a simulator for each signal to be issued. These simulators would need to be positioned in a manner coherent with the actual position in the sky of the relative satellite to be simulated. In addition to the low level signal and the high level navigation message (data-bits), each simulator should also simulate the movement of the specific satellite, attempting to reproduce the Doppler effect (displacement) of each individual radio signal.

This type of attack is purely theoretical and impracticable in reality, in view of the requested precision in replicating the absolute and relative position and speed of all the satellites in view.

Therefore, in practice, this type of attack is carried out by means of a GNSS simulator equipped with a single antenna which emits various GNSS radio signals which are suitably modulated to appear as real GNSS radio signals.

If the GNSS radio signals all come from a same direction relative to the mobile device, it means that there has been a fraudulent attempt.

Figure 2:
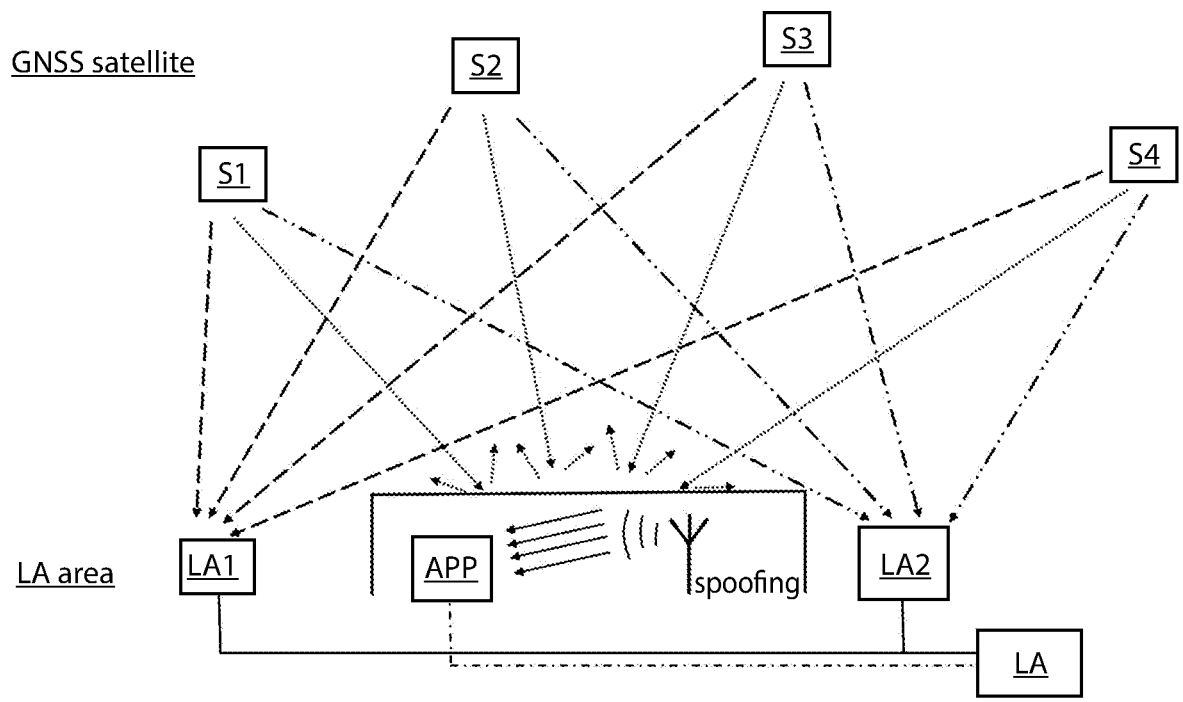
FIG. 2 shows a SCENARIO 1: spoofing of the GNSS signal with a single antenna simulator in an environment isolated from signals sent from the satellites.

The method must therefore oppose attackers who wish to exhibit a position different from that actually occupied. It must be possible to detect any method of falsification performed starting from another position. With reference to FIG. 2, the most complex and sophisticated scenario to be opposed is that in which a user wishes to falsify the relative position by isolating the mobile device from the real GNSS signals and transmitting various false GNSS signals, created ad hoc in the laboratory by means of one or more GNSS signal simulators (SCENARIO 1).

With reference to FIG. 3, according to a variant to this scenario the mobile device is irradiated, by means of an emitter in the laboratory, with an authentic signal coming from the position to be declared to the service or in the same position but to be adequately processed. In that case, the attacker must detect the authentic signal and send it to the simulator (SCENARIO 2).

With reference to FIG. 4, another possible scenario is the attempt to irradiate the target device only with some non-genuine signals in order to manipulate the position. In this case, it is necessary to irradiate the relative signals with a greater power so as to force the target device to acquire the latter rather than the weaker original GNSS signals (SCENARIO 3).

With respect to the above, STEP A of the method according to the invention is able to identify spoofing attempts with signals simulated in the laboratory such as SCENARIOS 1 and 2.

In SCENARIO 3 it is necessary to consider the low power with which the real GNSS signals arrive from space. If the GNSS receiver is not completely isolated from external signals, any attacker who users a simulator to irradiate a non-genuine signal must use a signal power which is greater than that of the original, so as to trick the mobile device and induce it to couple with the signal created ad hoc rather than the original weak satellite radio signal. STEP B verifies the power of the signal; a higher power indicates that the signal is not genuine. Also in the case of complete isolation, any attacker would have to irradiate the device with a correct level of power and recreate a coherent signal/noise ratio and coherent statistics of the noise of the GPS pseudorange code C/A-code L1 for each satellite to be simulated.

As a further reinforcement against spoofing attacks, STEPS C and D of the method according to the invention force an attacker to send signals which are effectively detected by the satellites and not generated artificially; this is the case for all the visible satellites and not just for those necessary for calculating the position. The attacker is forced to detect the authentic signals and, if necessary, process them to alter the position.

The preferred embodiments have been described above and variants to the invention have been suggested, but it shall be understood that the invention may be modified and/or adapted by experts in the field without thereby departing from the scope of the inventive concept, as defined in the claims herein.

The invention claimed is:

1. Georeferencing certification method for a certification of a mobile device, equipped with a mobile device clock and a mobile GNSS sensor, by a certification server equipped with a server GNSS sensor and a server clock, the mobile device and the certification server being connected through a data communication network, said method comprising:
   running on the mobile device an application configured to manage the certification on the mobile device side;
   requesting, through said application, a georeferencing certification to said certification server;
   performing a synchronization between the mobile device clock and the server clock, by performing a time synchronization protocol simultaneously on the mobile device and the certification server;
   acquiring, via said mobile GNSS sensor and for each radio-visible satellite, a GNSS satellite radio signal at any instant of time of a predefined time window;
   obtaining from said mobile GNSS sensor and sending to said certificate servers a set of information derived from said GNSS satellite radio signal relating to:
      a first data group relating to power, signal/noise ratio and noise of the pseudorange code C/A-code,
      a second data group relating to military pseudorange code including encrypted P(Y) code and a structure data of a data packet and of data bits contained therein including telemetry and navigation message, and
      a third data group relating to Doppler effect, carrier wave and phase;
   acquiring, by means of said GNSS server sensor and for each radio-visible satellite, a GNSS satellite radio signal at any instant of time of a predefined time window;
   obtaining, from said GNSS server sensor, on the basis of said GNSS satellite radio signal from said GNSS server sensor, a first, a second and a third set of data corresponding to the set of information relating to said first, said second and said third data group;
   calculating by said certificate serve:
      signal direction, speed and displacement of each radio-visible satellite, which is radio-visible to the mobile device, on the basis of said set of information relating to the third group; and
      signal direction, speed and displacement of each radio-visible satellite, which is radio-visible to the certification server, on the basis of said third set of data;
   comparing, by the certificate server:
      said set of information relating to the first group and said first set of data, one by one, to verify that differences fall into predefined intervals;
      said set of information relating to the second group and said second set of data, one by one, to verify that they are identical; and
      the signal direction, the speed and the displacement of the radio-visible satellite that is radio-visible to the mobile device, and the signal direction, the speed and the displacement of the radio-visible satellite, that is radio-visible to the server, one by one, to verify that differences fall into further predefined intervals;
   only in the case where all the verifications by said comparing are positive, sending, by the certification server to the mobile device, a georeferencing certificate that includes the date, said predetermined time window and the position of the mobile device in said time window.

2. The method according to claim 1, wherein the communication between the mobile device and the certification server is carried out using encrypted communication protocols.

3. The method according to claim 1, wherein the time window has a minimum amplitude between 4 and 10 seconds.

4. The method according to claim 1, wherein said georeferencing certificate is digitally signed and timestamped.

5. The method according to claim 1, further comprising registering the mobile application to the certification server as a preliminary phase.

6. The method according to claim 1, wherein in said calculating by said certificate server a radio signals interferometry technique is used to calculate values of the signal direction, the speed and the displacement of the satellite.

7. Georeferencing certification system using the certification method of claim 1, comprising:
- a mobile device equipped with a mobile device clock and a mobile GNSS sensor; and
- a certification server with a server GNSS sensor and a server clock,
- wherein an application is installed on the mobile device, which is configured to perform:
  - said running on the mobile device the application;
  - said requesting, through said application, a georeferencing certification to said certification server;
  - said performing a synchronization between the mobile device clock and the certification server clock;
  - said acquiring, via said mobile sensor GNSS sensor and for each radio-visible satellite a GNSS satellite radio signal at any instant of time of a predefined time window; and
  - said obtaining from said mobile GNSS sensor and sending to said certificate server a set of information derived from said GNSS satellite radio signal relating to the first, and the second and the third data group, and
- an application is installed on the certification server, which is configured to perform:
  - said performing the synchronization between the mobile device clock and the certification server clock;
  - said acquiring, by means of said GNSS server sensor and for each radio-visible satellite a GNSS satellite radio signal at any instant of time of a predefined time window;
  - said obtaining, from said GNSS server sensor, on the basis of said GLASS satellite radio signal from said GNSS server sensor, a first, a second and a third set of data corresponding to said first said second and said third data group;
  - said calculating signal direction, speed and displacement of each radio-visible satellite, which is radio-visible to the mobile device, on the basis of said set of information relate to the third group; and signal direction, speed and displacement of each radio-visible satellite, which is radio-visible to the certification server, on the basis of said third set of data;
  - said comparing said set of information relate to the first group and said first set of data, one by one, to verify that the differences fall into predefined intervals; said set of information relate to the second group and said second set of data, one by one, to verify that they are identical; and the signal direction, the speed and the displacement of the radio-visible satellite that is radio-visible to the mobile device, and the signal direction, the speed and the displacement of the radio-visible satellite, that is radio-visible to the server, one by one, to verify that the differences fall into further predefined intervals; and
  - only in the case where all the previous verifications by said comparing are positive, sending to the mobile device, a georeferencing certificate that includes the date, said predetermined time window and the position of the mobile device in said time window.

* * * * *